(12) United States Patent
Chan et al.

(10) Patent No.: US 11,754,769 B1
(45) Date of Patent: Sep. 12, 2023

(54) BACKLIGHT KIT

(71) Applicant: Primax Electronics Ltd., Taipei (TW)

(72) Inventors: Wei-Ping Chan, Taipei (TW);
Ruey-Piin Wang, Taipei (TW);
Chia-Ming Li, Taipei (TW); Hung-Wei Kuo, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/125,284

(22) Filed: Mar. 23, 2023

(30) Foreign Application Priority Data

Jan. 11, 2023 (TW) .................................. 112101252

(51) Int. Cl.
*F21V 8/00* (2006.01)

(52) U.S. Cl.
CPC ......... *G02B 6/0046* (2013.01); *G02B 6/0043* (2013.01); *G02B 6/0051* (2013.01); *G02B 6/0088* (2013.01)

(58) Field of Classification Search
CPC .. G02B 6/0046; G02B 6/0088; G02B 6/0051; G02B 6/0043
See application file for complete search history.

(56) References Cited

U.S. PATENT DOCUMENTS

| 2011/0063875 A1* | 3/2011 | Yang | G02B 6/0023 362/621 |
|---|---|---|---|
| 2016/0170123 A1* | 6/2016 | Oh | G02B 6/0046 362/608 |

\* cited by examiner

*Primary Examiner* — Karabi Guharay
(74) *Attorney, Agent, or Firm* — KIRTON McCONKIE; Evan R. Witt

(57) ABSTRACT

A backlight kit includes a base member, a covering member, a slim-type light guide element and an illumination module. The covering member is combined with the base member. The slim-type light guide element and the illumination module are arranged between the base member and the covering member. After the illumination module emits a light beam to the slim-type light guide element, the light beam is transferred through the slim-type light guide element. Consequently, a luminance gradient region is formed on the surface of the covering member.

22 Claims, 17 Drawing Sheets

BACKLIGHT KIT

FIELD OF THE INVENTION

The present invention relates to a light source structure, and more particularly to a backlight kit for an electronic device.

BACKGROUND OF THE INVENTION

As known, a light emitting diode (LED) has the characteristics of small size, low power consumption, long life and quick operation response. Consequently, LEDs have been widely applied to the backlight sources of sign lights, advertising lights, vehicle light sources, motorcycle light sources, outdoor/indoor lighting devices, monitors or computer peripherals.

In today's society, electronic devices have become daily necessities for life. Due to diverse types of electronic devices, the competitive pressure of similar categories of products is also increasing. In order to make the produced electronic devices more recognizable, LED light sources are usually installed in electronic devices. Due to the arrangement of the LED light source, the electronic device can produce a special luminous visual effect. The luminous visual effect can attract the consumers' attention. In addition, the installation of the LED light source increases the convenience of using the electronic device. Consequently, the electronic devices can gain the favor of consumers and enhance their buying willingness.

FIG. 1 is a schematic perspective view illustrating a portion of the structure of a conventional backlight kit. The conventional backlight kit 90 is designed according to a backlight technology. As shown in FIG. 1, the conventional backlight kit 90 comprises a housing 91, a light-guiding element 92 and a LED light source 93. The light-guiding element 92 comprises a first light-guiding part 921 and a second light-guiding part 922. The thickness of the light-guiding element 92 is gradually decreased from the first light-guiding part 921 to the second light-guiding part 922. The LED light source 93 is located under the first light-guiding part 921. After a light beam L emitted by the LED light source 93 is projected to the first light-guiding part 921, a luminance gradient region B' is formed on the surface of the light-guiding element 92 according to the thickness change of the light-guiding element 92. Consequently, the electronic device with the backlight kit 90 produces a luminance-gradient visual effect.

However, since the first light-guiding part 921 of the light-guiding element 92 is relatively thicker, this design is detrimental to the miniaturization of the overall volume of the electronic device. Consequently, the electronic device cannot meet the slimness requirements. In addition, the position of the LED light source 93 is restricted. That is, the LED light source 93 has to be located at the position corresponding to the highest luminance region of the luminance gradient region B'. Due to the limitation, the flexibility and freedom of the electronic circuit in the electronic device will be deteriorated.

In order to overcome the drawbacks of the conventional technologies, it is important to provide a backlight kit with a function of producing a luminance-gradient visual effect while reducing the volume of the backlight kit and increasing the flexibility and freedom of the electronic circuit in the electronic device.

SUMMARY OF THE INVENTION

The present invention provides a backlight kit for an electronic device or a peripheral connection port of the electronic device. The backlight kit can provide a function of producing a luminance-gradient visual effect.

In accordance with an aspect of the present invention, a backlight kit is provided. The backlight kit includes a base member, a covering member, a slim-type light guide element and an illumination module. The base member includes a concave structure. The covering member is combined with the base member. The covering member includes a lateral wall part. The concave structure of the base member is covered by the lateral wall part. The slim-type light guide element is disposed within the concave structure of the base member. The slim-type light guide element includes a first surface and a second surface. The first surface and the second surface are opposed to each other. The first surface faces the lateral wall part of the covering member. The second surface faces the concave structure of the base member. In addition, at least three light diffusion structure regions are formed on a first side and the first surface of the slim-type light guide element. The illumination module is installed on a second side of the slim-type light guide element. The second side of the slim-type light guide element is away from the at least three light diffusion structure regions. After the illumination module emits a light beam, the light beam is transferred through the slim-type light guide element, and a first-portion light beam, a second-portion light beam and a third-portion light beam are respectively exited from a first light diffusion structure region, a second light diffusion structure region and a third light diffusion structure region of the at least three light diffusion structure regions. After the first-portion light beam, the second-portion light beam and the third-portion light beam are transferred to the lateral wall part of the covering member, a first luminance region, a second luminance region and a third luminance region are formed on the lateral wall part of the covering member. The first luminance region, the second luminance region and the third luminance region are collaboratively formed as a luminance gradient region.

In an embodiment, each of the at least three light diffusion structure regions includes light diffusion microstructures, and the light diffusion microstructures are dot structures or textured structures.

In an embodiment, an average size of the light diffusion microstructures in the third light diffusion structure region is larger than an average size of the light diffusion microstructures in the second light diffusion structure region, and the average size of the light diffusion microstructures in the second light diffusion structure region is larger than an average size of the light diffusion microstructures in the first light diffusion structure region.

In an embodiment, the average size of the light diffusion microstructures in the third light diffusion structure region is larger than 10 µm, the average size of the light diffusion microstructures in the second light diffusion structure region is in a range between 4 µm and 8 µm, and the average size of the light diffusion microstructures in the first light diffusion structure region is in a range between 2 µm and 4 µm.

In an embodiment, a width of the luminance gradient region is equal to or larger than 20 mm.

In an embodiment, the backlight kit further includes a light diffusion element. The light diffusion element is arranged between the lateral wall part of the covering member and the slim-type light guide element, and the light diffusion element is aligned with the at least three light diffusion structure regions.

In an embodiment, the slim-type light guide element includes a first light-guiding part and a second light-guiding part.

In an embodiment, the at least three light diffusion structure regions are installed on the first surface of the second light-guiding part of the slim-type light guide element.

In an embodiment, the illumination module includes a flexible circuit board and plural light-emitting units, and the plural light-emitting units are installed on a surface of the flexible circuit board.

In an embodiment, plural openings are formed in the first surface of the first light-guiding part of the slim-type light guide element, and the plural light-emitting units are respectively disposed within the plural openings.

In an embodiment, a receiving groove is formed in the first surface of the first light-guiding part of the slim-type light guide plate, and the plural light-emitting units are disposed within the receiving groove.

In an embodiment, an avoidance gap is formed between the first light-guiding part of the slim-type light guide plate and the covering member, and the plural light-emitting units are disposed within the avoidance gap.

In an embodiment, the first surface of the first light-guiding part of the slim-type light guide element is covered by the flexible circuit board.

In an embodiment, a light-shading layer is formed on another surface of the flexible circuit board where the light-emitting units are not installed.

In an embodiment, the light-emitting units are light emitting diode (LED) units, organic light emitting diode (OLED) units, quantum dots light emitting diode (QLED) units or electroluminescence (EL) units.

In an embodiment, the backlight kit further includes a reflecting element. The reflecting element is arranged between the slim-type light guide element and the concave structure of the base member. The reflecting element is aligned with the at least three light diffusion structure regions.

In accordance with another aspect of the present invention, a backlight kit is provided. The backlight kit includes a base member, a slim-type light guide element, a covering member and an illumination module. The base member includes a concave structure. The slim-type light guide element is disposed within the concave structure. The slim-type light guide element includes a first surface and a second surface. The first surface and the second surface are opposed to each other. The second surface faces the concave structure of the base member. A light-guiding gap is formed between a first side of the slim-type light guide element and the base member. The covering member is combined with the base member. The covering member includes a lateral wall part. A light-guiding rib is installed on an inner wall of the lateral wall part and aligned with the light-guiding gap. The concave structure of the base member is covered by the lateral wall part. The light-guiding rib is inserted in the light-guiding gap. The illumination module is installed on a second side of the slim-type light guide element. The second side of the slim-type light guide element is away from the light-guiding gap. After the illumination module emits a light beam, the light beam is transferred through the slim-type light guide element, and a first-portion light beam and a second-portion light beam are respectively exited from the first surface of the slim-type light guide element and the light-guiding rib. After the first-portion light beam and the second-portion light beam are transferred to the lateral wall part of the covering member, a first luminance region and a second luminance region are formed on the lateral wall part of the covering member. The first luminance region and the second luminance region are collaboratively formed as a luminance gradient region.

In an embodiment, the illumination module includes a flexible circuit board and plural light-emitting units, and the plural light-emitting units are installed on a surface of the flexible circuit board.

In an embodiment, plural openings are formed in the first surface and the second side of the slim-type light guide element. The second side of the slim-type light guide element is away from the light-guiding gap. The plural light-emitting units are respectively disposed within the plural openings.

In an embodiment, a portion of the first surface of the slim-type light guide element is covered by the flexible circuit board.

In an embodiment, a light-shading layer is formed on another surface of the flexible circuit board where the light-emitting units are not installed.

In an embodiment, the light-emitting units are light emitting diode (LED) units, organic light emitting diode (OLED) units, quantum dots light emitting diode (QLED) units or electroluminescence (EL) units.

From the above descriptions, the present invention provides the backlight kit. Due to the arrangement of the slim-type light guide element, the backlight kit produces a luminance-gradient visual effect. Moreover, the arrangement of the slim-type light guide element can reduce the volume of the backlight kit. Consequently, the overall volume of the electronic device with the backlight kit can be effectively reduced, and the electronic device can meet the slimness requirements. In addition, a luminance gradient region is created at the end of the slim-type light guide element away from the light-emitting units. In other words, it is not necessary to install the light-emitting unit at the position corresponding to the luminance gradient region. Furthermore, the flexibility and freedom of the electronic circuit in the electronic device can be effectively enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
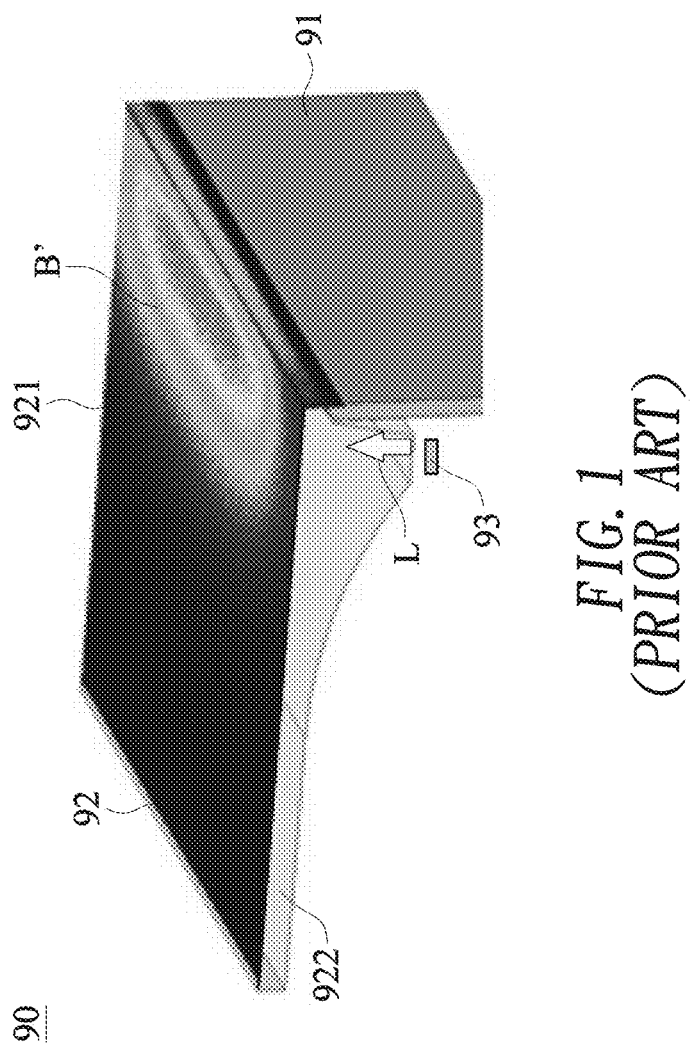
FIG. 1 is a schematic perspective view illustrating a portion of the structure of a conventional backlight kit.
Figure 2A:
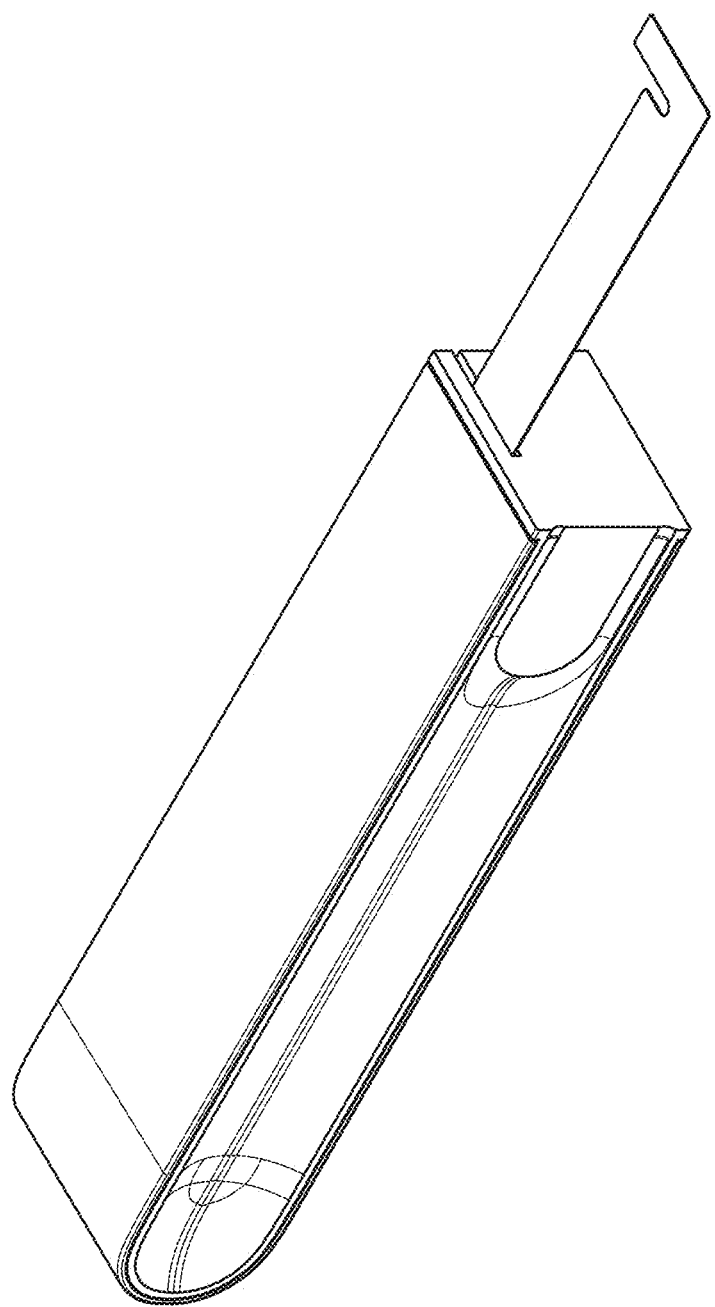
FIG. 2A is a schematic perspective view illustrating a backlight kit according to a first embodiment of the present invention.
Figure 2B:
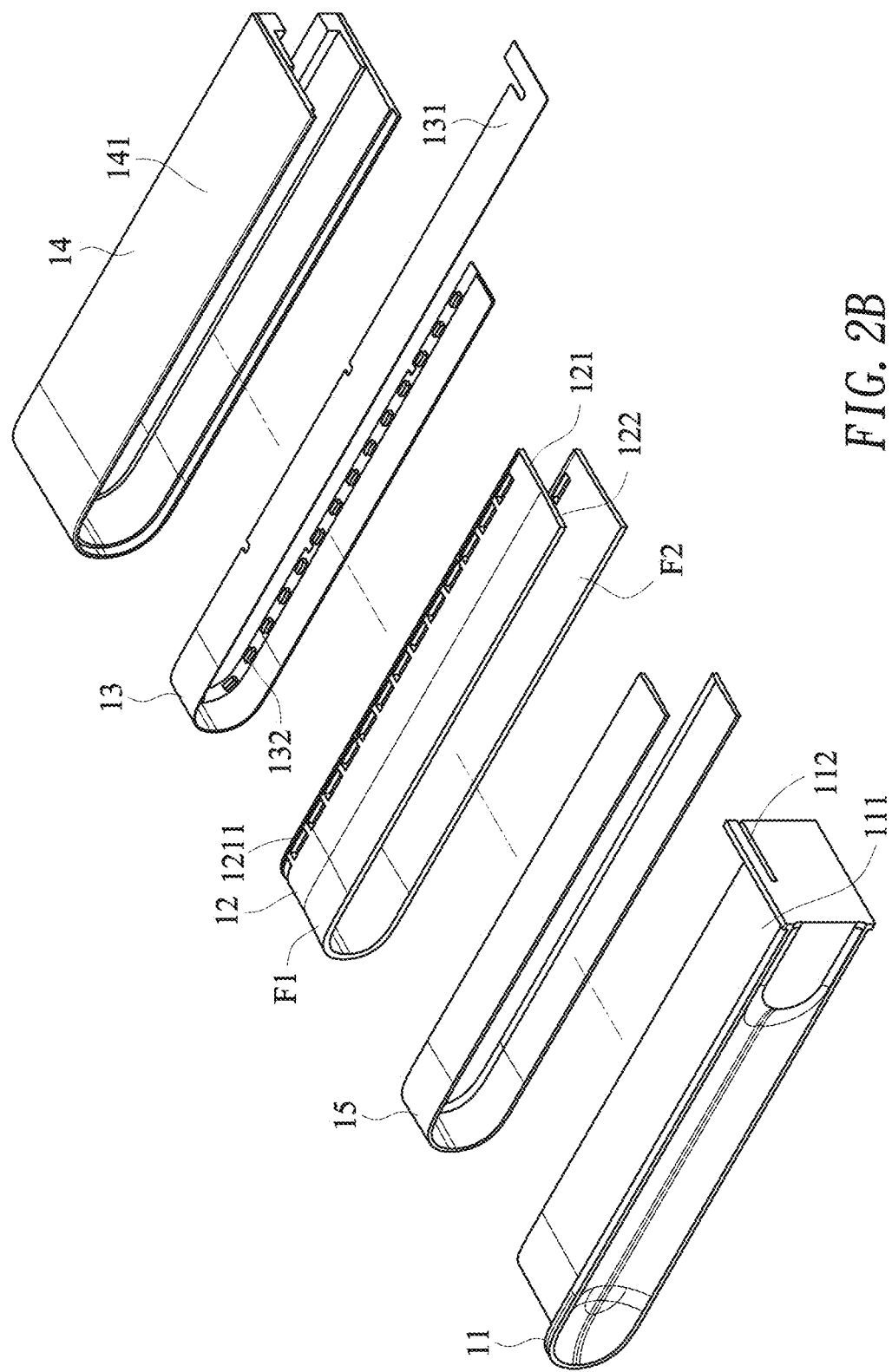
FIG. 2B is a schematic exploded view illustrating the backlight kit according to the first embodiment of the present invention.

Please refer to FIGS. 2A and 2B. FIG. 2A is a schematic perspective view illustrating a backlight kit according to a first embodiment of the present invention. FIG. 2B is a schematic exploded view illustrating the backlight kit according to the first embodiment of the present invention. The backlight kit 10 can be installed on a housing of a peripheral connection port of an electronic device. Furthermore, the backlight kit 10 can produce a luminous visual effect to prompt the user to know the position of the peripheral connection port or the usage status of the peripheral connection port. In this embodiment, the backlight kit 10 comprises a base member 11, a slim-type light guide element 12, an illumination module 13, a covering member 14 and a light diffusion element 15.

The base member 11 comprises a concave structure 111. A closed end of the concave structure 111 has a notch 112. The notch 112 is in parallel with the concave structure 111.

The slim-type light guide element 12 has a first surface F1 and a second surface F2, which are opposed to each other. In addition, the slim-type light guide element 12 comprises a first light-guiding part 121 and a second light-guiding part 122, which are connected with each other. In addition, plural openings 1211 are formed in the first surface F1 of the first light-guiding part 121.

The illumination module 13 comprises a flexible circuit board 131 and plural light-emitting units 132. The plural light-emitting units 132 are installed on a surface of the flexible circuit board 131. For example, the light-emitting units 132 are light emitting diode (LED) units, organic light emitting diode (OLED) units, quantum dots light emitting diode (QLED) units or electroluminescence (EL) units.

The covering member 14 comprises a lateral wall part 141. Furthermore, in order to match the appearance design of the concave structure 111, the cross section of the slim-type light guide element 12 and the cross section of the light diffusion element 15 are both U-shaped.

Figure 2C:
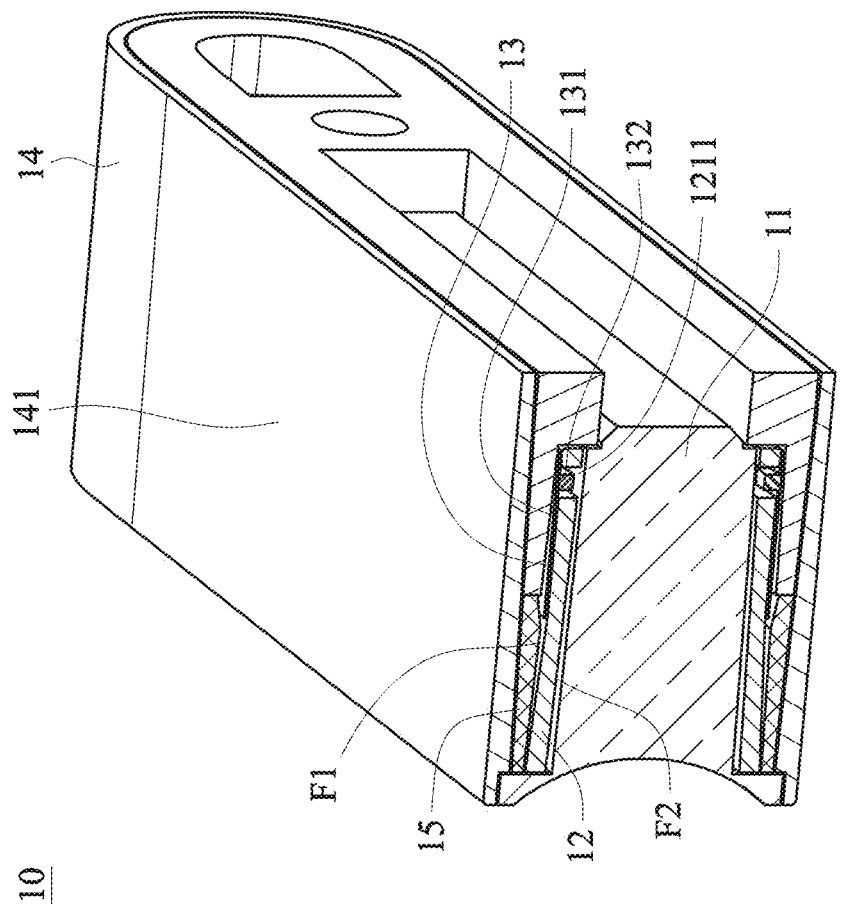
FIG. 2C is a schematic cutaway view illustrating the backlight kit according to the first embodiment of the present invention.
Figure 2D:
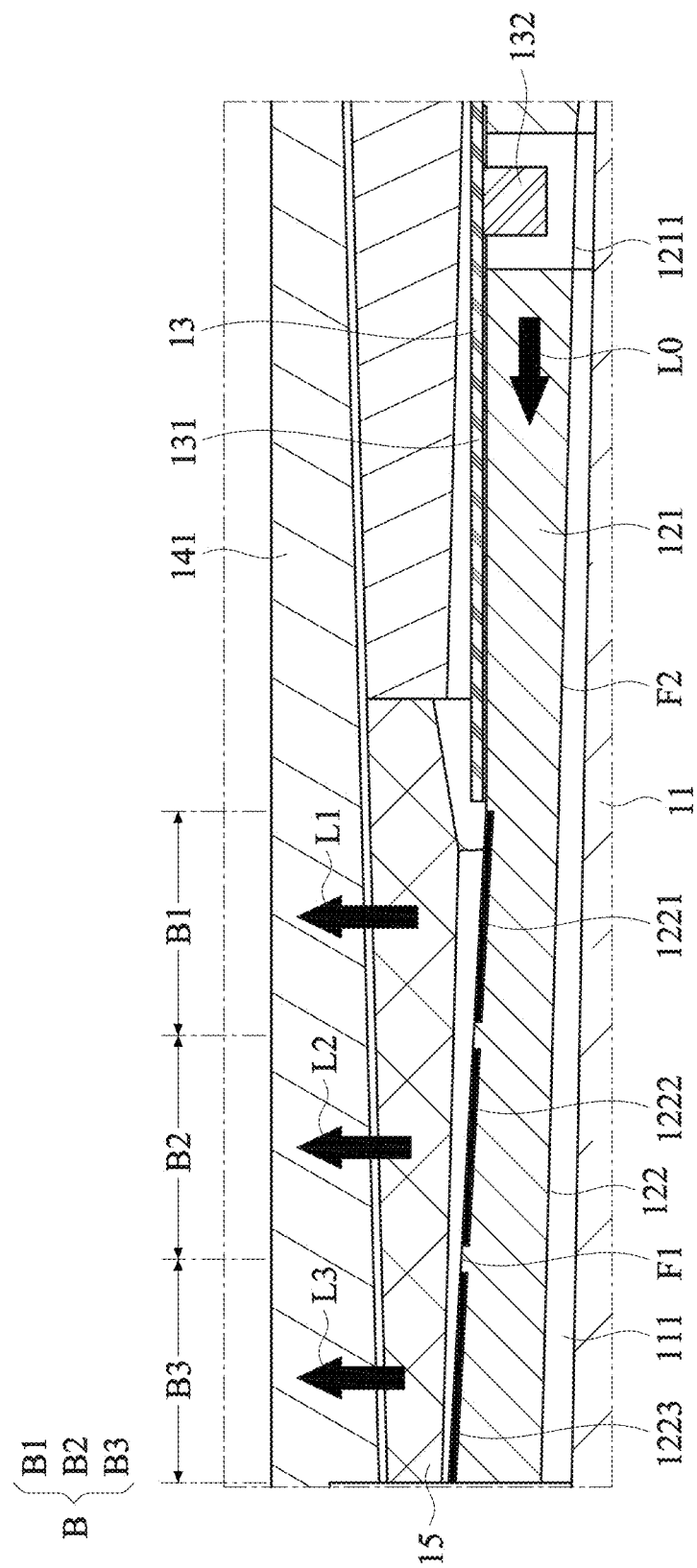
FIG. 2D is a schematic cross-sectional view illustrating an enlarged portion of the backlight kit according to the first embodiment of the present invention.

Please refer to FIGS. 2C and 2D. FIG. 2C is a schematic cutaway view illustrating the backlight kit according to the first embodiment of the present invention. FIG. 2D is a schematic cross-sectional view illustrating an enlarged portion of the backlight kit according to the first embodiment of the present invention.

The assembled structure of the backlight kit 10 will be described as follows. The covering member 14 and the base member 11 are combined with each other. In addition, the concave structure 111 of the base member 11 is covered by the lateral wall part 141 of the covering member 14. The slim-type light guide element 12 is disposed within the concave structure 111 of the base member 11. The first surface F1 of the slim-type light guide element 12 faces the lateral wall part 141 of the covering member 14. The second surface F2 of the slim-type light guide element 12 faces the concave structure 111 of the base member 11. In this embodiment, the slim-type light guide element 12 has a U-shaped structure, and the slim-type light guide element 12 is locked in the concave structure 111 of the base member 11 through the U-shaped structure.

The illumination module 13 is installed on the first light-guiding part 121 of the slim-type light guide element 12. In an embodiment, a double-sided tape or a layout adhesive is formed on the surface of the flexible circuit board 131 with the light-emitting units 132. Through the double-sided tape or the layout adhesive, the illumination module 13 is adhered on the first surface F1 of the slim-type light guide element 12. Furthermore, the plural light-emitting units 132 are respectively disposed within the corresponding openings 1211. A portion of the flexible circuit board 131 is protruded out of the notch 112. The flexible circuit board 131 can be electrically connected with a main board or a control circuit (not shown) of the electronic device. Consequently, the operating mode or the operating time of the light-emitting units 132 can be controlled by the main board or the control circuit.

The light diffusion element 15 is arranged between the lateral wall part 141 of the covering member 14 and the slim-type light guide element 12. In addition, the light diffusion element 15 is aligned with the second light-guiding part 122 of the slim-type light guide element 12.

The first surface F1 of the second light-guiding part 122 of the slim-type light guide element 12 is divided into three consecutive light diffusion structure regions 1221, 1222 and 1223. Each of the light diffusion structure regions 1221, 1222 and 1223 contains plural light diffusion microstructures (not shown). For example, the light diffusion microstructures are dot structure formed by a stamping process, or the light diffusion microstructures are textured structures formed through portion treatment.

Preferably, the average size of the light diffusion microstructures in the third light diffusion structure region 1223 is larger than the average size of the light diffusion microstructures in the second light diffusion structure region 1222, and the average size of the light diffusion microstructures in the second light diffusion structure region 1222 is larger than the average size of the light diffusion microstructures in the first light diffusion structure region 1221. In this embodiment, the light diffusion microstructures in the third light diffusion structure region 1223 are rough textured structures with the average size larger than 10 μm, the light diffusion microstructures in the second light diffusion structure region 1222 are medium textured structures with the average size in the range between 4 μm and 8 μm, and the light diffusion microstructures in the first light diffusion structure region 1221 are fine textured structures with the average size in the range between 2 μm and 4 μm.

In some other possible embodiments, the light diffusion structure regions 1221, 1222 and 1223 are dot structures with different densities. For example, the third light diffusion structure region 1223 is a high-density dot region with a smaller distance between the light diffusion microstructures, the second light diffusion structure region 1222 is a medium-density dot region with a medium distance between the light diffusion microstructures, and the first light diffusion structure region 1221 is a low-density dot region with a larger distance between the light diffusion microstructures.

Please refer to the FIG. 2D again. After the light-emitting units 132 of the illumination module 13 emit a light beam L0 to the slim-type light guide element 12, the light beam L0 is transferred within the slim-type light guide element 12. Then, the light beam L0 is transferred through the light diffusion structure regions 1221, 1222 and 1223. Consequently, a first-portion light beam L1, a second-portion light beam L2 and a third-portion light beam L3 are respectively exited from the light diffusion structure regions 1221, 1222 and 1223. Among the light diffusion structure regions 1221, 1222 and 1223, the average size of the third light diffusion microstructures in the light diffusion structure region 1223 is the largest. Consequently, the luminance of the third-portion light beam L3 is the highest, the luminance of the second-portion light beam L2 is the second highest, and the luminance of the first-portion light beam L1 is the lowest.

After the first-portion light beam L1, the second-portion light beam L2 and the third-portion light beam L3 are respectively exited from the light diffusion structure regions 1221, 1222 and 1223, the first-portion light beam L1, the second-portion light beam L2 and the third-portion light beam L3 are processed by the light diffusion element 15 and subjected to the secondary optical diffusion. Consequently, the light beam outputted from the backlight kit 10 is more uniform. Then, the first-portion light beam L1, the second-portion light beam L2 and the third-portion light beam L3 are transferred to the lateral wall part 141 of the covering member 14. Consequently, a first luminance region B1, a second luminance region B2 and a third luminance region B3 are formed on the surface of the lateral wall part 141 of the covering member 14.

Similarly, the luminance of the third luminance region B3 corresponding to the third-portion light beam L3 is the highest, the luminance of the second luminance region B2 corresponding to the second-portion light beam L2 is the second highest, and the luminance of the first luminance region B1 corresponding to the first-portion light beam L1 is the lowest. In other words, the first luminance region B1, the second luminance region B2 and the third luminance region B3 are collaboratively formed as a luminance gradient region B. Consequently, in the backlight kit 10, the surface of the lateral wall part 141 of the covering member 14 produces a luminance-gradient visual effect. In this embodiment, the width of the luminance gradient region B is equal to or larger than 20 mm.

Figure 3A:
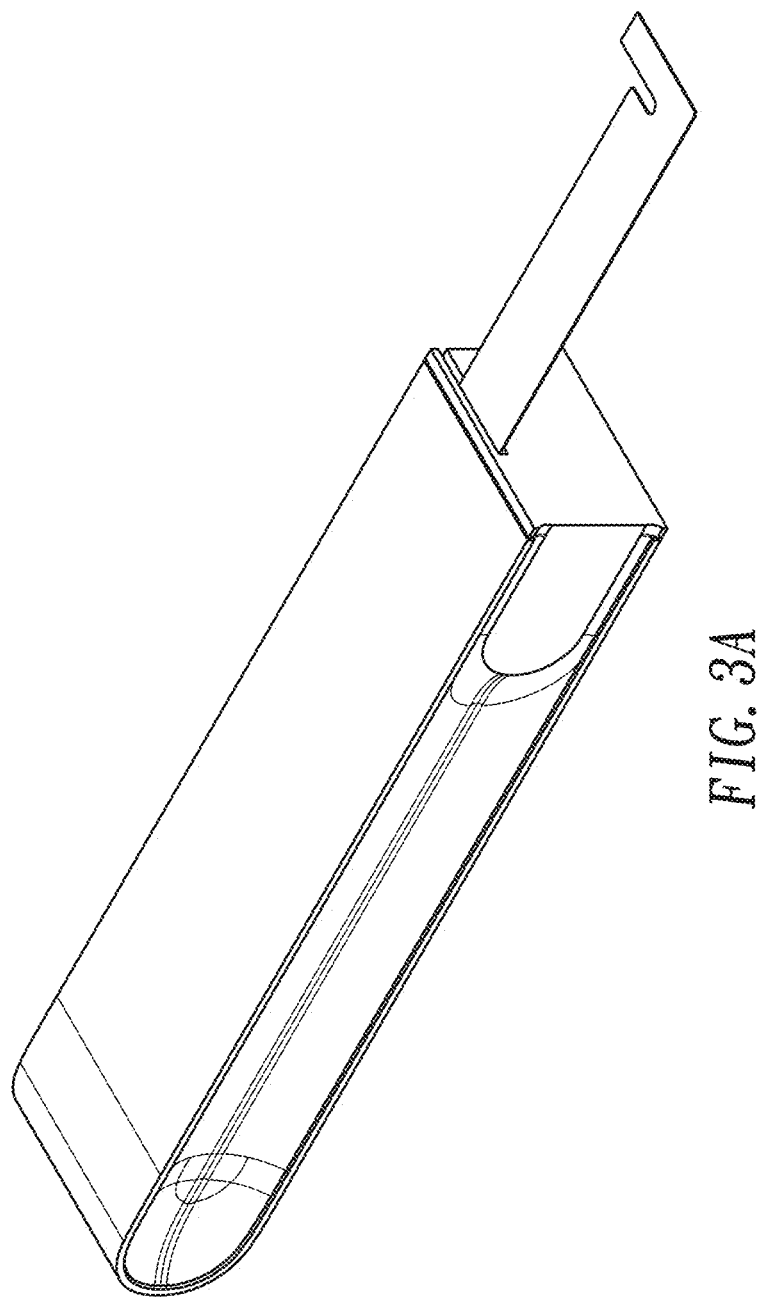
FIG. 3A is a schematic perspective view illustrating a backlight kit according to a second embodiment of the present invention.
Figure 3B:
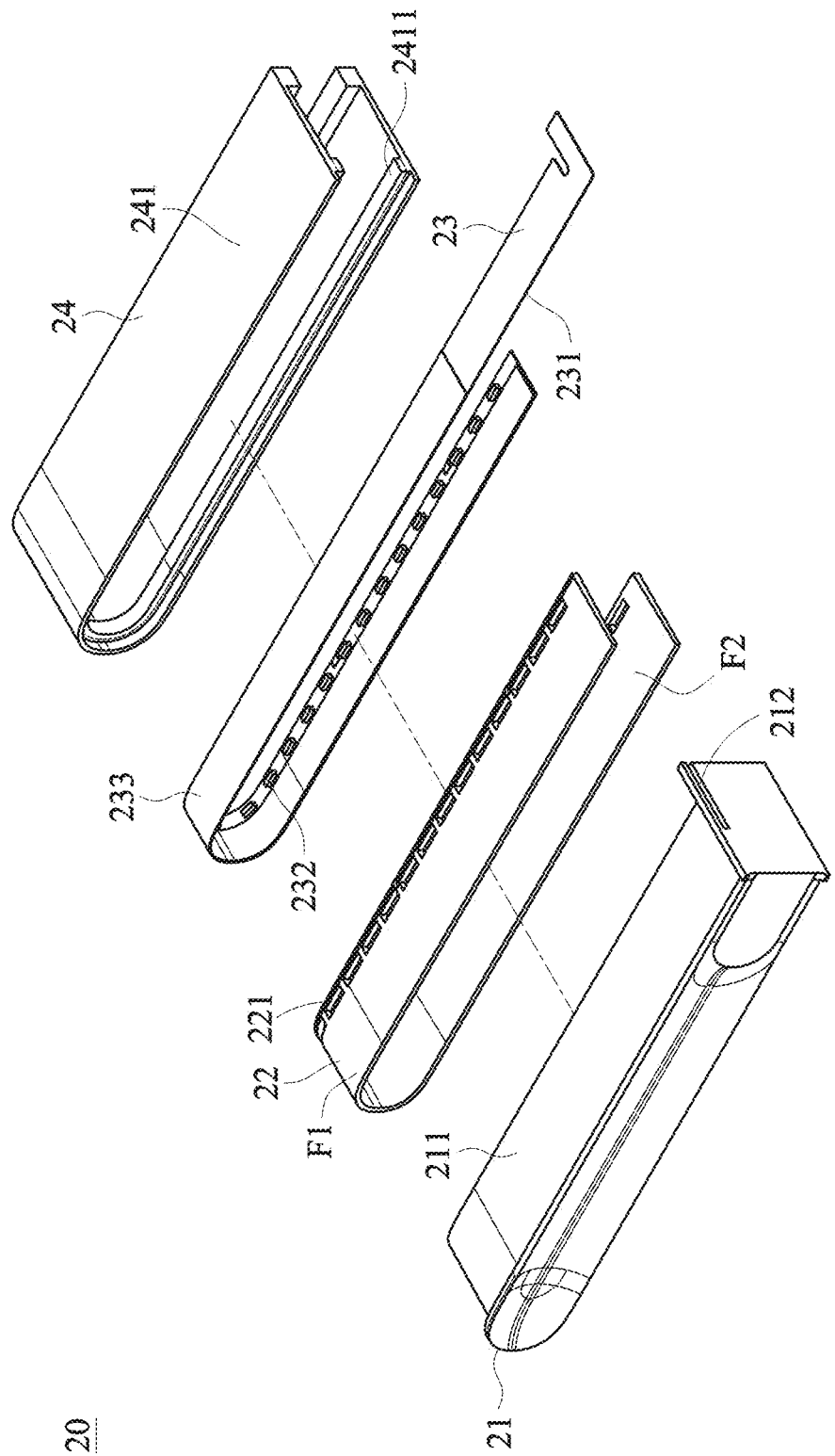
FIG. 3B is a schematic exploded view illustrating the backlight kit according to the second embodiment of the present invention.

Please refer to FIGS. 3A and 3B. FIG. 3A is a schematic perspective view illustrating a backlight kit according to a second embodiment of the present invention. FIG. 3B is a schematic exploded view illustrating the backlight kit according to the second embodiment of the present invention. The functions of the components of the backlight kit 20 that are similar to those of the backlight kit 10 of the first embodiment are not redundantly described herein. In comparison with the backlight kit 10 of the first embodiment, the slim-type light guide element 22 in the backlight kit 20 of this embodiment is not equipped with the first light-guiding part, the second light-guiding part and the light diffusion structure regions, and the width of the slim-type light guide element 22 is smaller than the width of the concave structure 211. In addition, a light-shading layer 233 is formed on the surface of the flexible circuit board 231 where the light-emitting units 232 are not installed, and a light-guiding rib 2411 is installed on the inner wall of the lateral wall part 241 of the covering member 24.

Figure 3C:
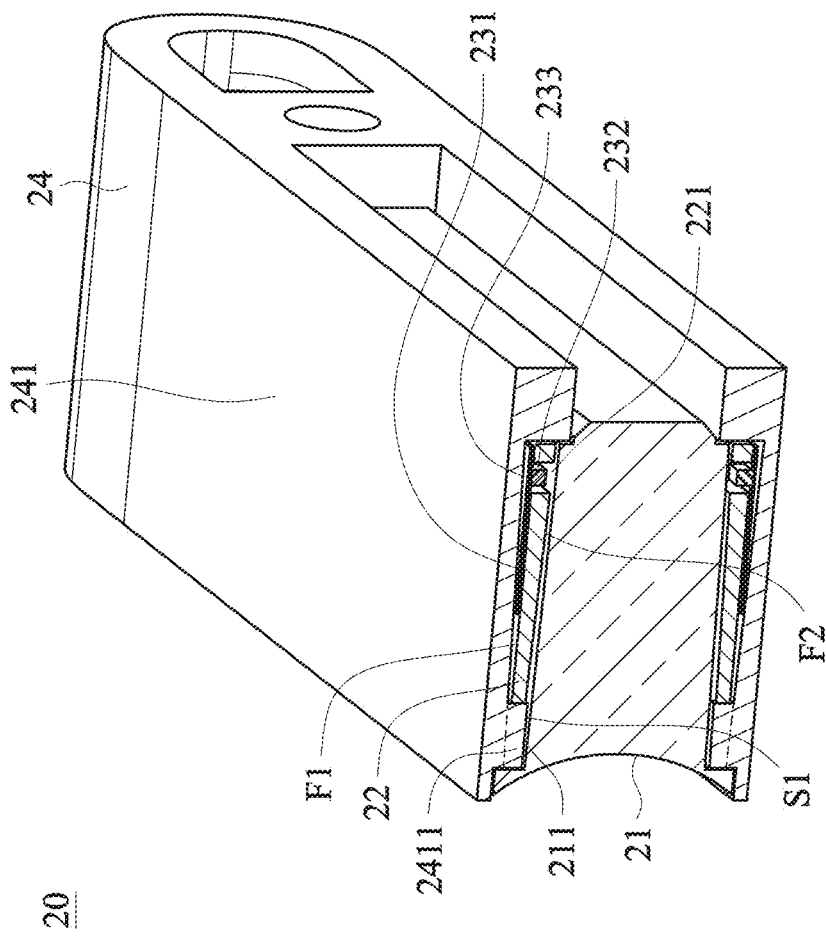
FIG. 3C is a schematic cutaway view illustrating the backlight kit according to the second embodiment of the present invention.
Figure 3D:
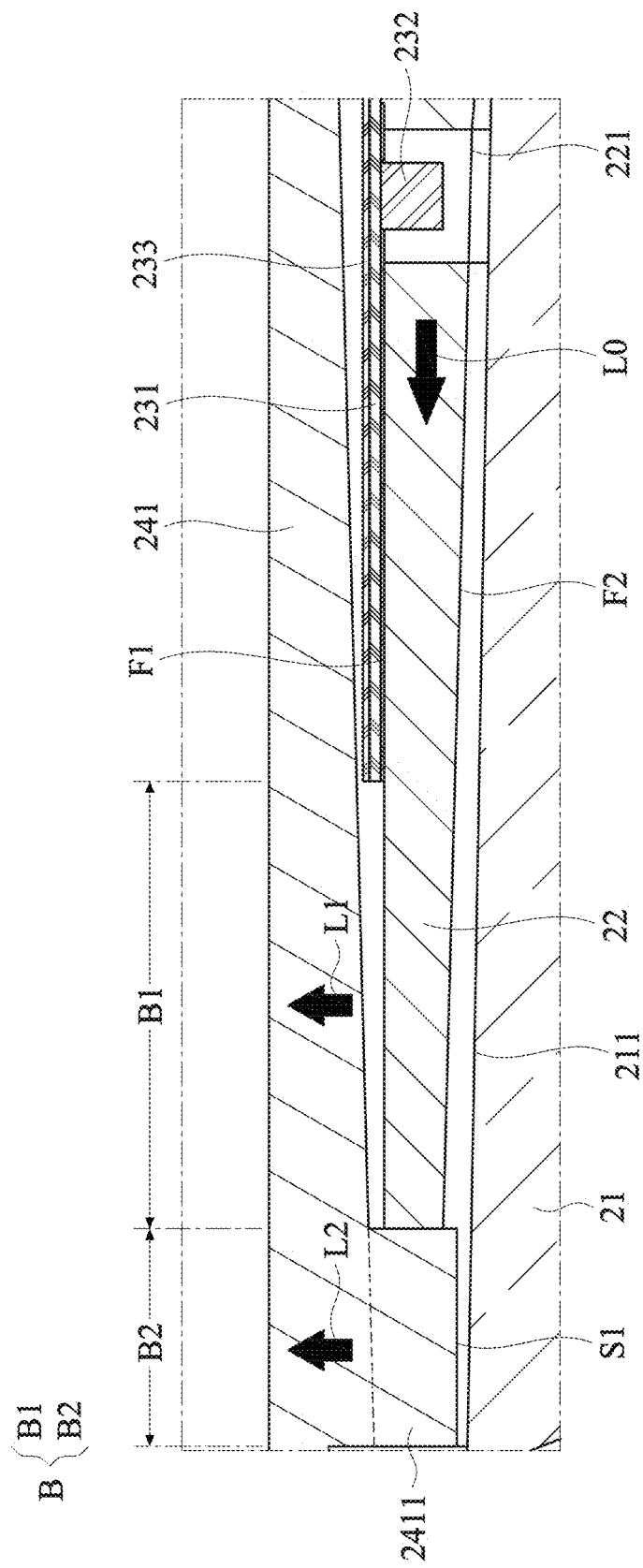
FIG. 3D is a schematic cross-sectional view illustrating an enlarged portion of the backlight kit according to the second embodiment of the present invention.

Please refer to FIGS. 3C and 3D. FIG. 3C is a schematic cutaway view illustrating the backlight kit according to the second embodiment of the present invention. FIG. 3D is a schematic cross-sectional view illustrating an enlarged portion of the backlight kit according to the second embodiment of the present invention. The assembled structure of the backlight kit 20 will be described as follows. Since the width of the slim-type light guide element 22 is smaller than the width of the concave structure 211, a light-guiding gap S1 is formed between one side of the slim-type light guide element 22 and the base member 21. Moreover, when the concave structure 211 is covered by the lateral wall part 241 of the covering member 24, the light-guiding rib 2411 of the lateral wall part 241 is inserted in the light-guiding gap S1.

After the light-emitting units 232 of the illumination module 23 emit a light beam L0 to the slim-type light guide element 22, the light beam L0 is transferred within the slim-type light guide element 22. Since the width of the slim-type light guide element 22 is reduced, the light-shading layer 233 can prevent the light beam L0 from being exited from the illumination module 23. Consequently, the luminous visual effect will not be adversely affected.

Then, a portion of the light beam L0 is transferred through the first surface F1 that is not shaded by the flexible circuit board 231 and the light-shading layer 233, and a first-portion light beam L1 is exited. In addition, another portion of the light beam L0 is transferred to the light-guiding rib 2411 through a distal end of the slim-type light guide element 22 (i.e., the end away from the illumination module 23), and thus a second-portion light beam L2 is exited from the light-guiding rib 2411. Then, the first-portion light beam L1 and the second-portion light beam L2 are transferred to the lateral wall part 241 of the covering member 24. Consequently, a first luminance region B1 and a second luminance region B2 are formed on the surface of the lateral wall part 241 of the covering member 24. Optionally, a luminous material is added to the light-guiding rib 2411 or the lateral wall part 241. Consequently, the luminous visual effect formed on the lateral wall part 241 is enhanced.

As mentioned above, the width of the slim-type light guide element 22 is reduced. In addition, a portion of the first surface F1 of the second light-guiding part 222 is shaded by the flexible circuit board 231 and the light-shading layer 233. Since a greater portion of the light beam L0 is transferred to the light-guiding rib 2411 through the distal end of the slim-type light guide element 22, the luminance of the second-portion light beam L2 is higher than the luminance of the first-portion light beam L1.

Similarly, the luminance of the second luminance region B2 corresponding to the second-portion light beam L2 is higher than the luminance of the first luminance region B1 corresponding to the first-portion light beam L1. In other words, the first luminance region B1 and the second luminance region B2 are collaboratively formed as a luminance gradient region B. Consequently, in the backlight kit 20, the surface of the lateral wall part 241 of the covering member 24 produces a luminance-gradient visual effect.

As mentioned above, the backlight kit 20 of this embodiment is only able to produce two-layered luminance-gradient visual effect. However, since the width of the slim-type light guide element 22 is reduced, the volume of the backlight kit 20 can be further reduced. Consequently, the overall volume of the electronic device with the backlight kit 20 can be reduced, and the electronic device can meet the slimness requirements.

Figure 4A:
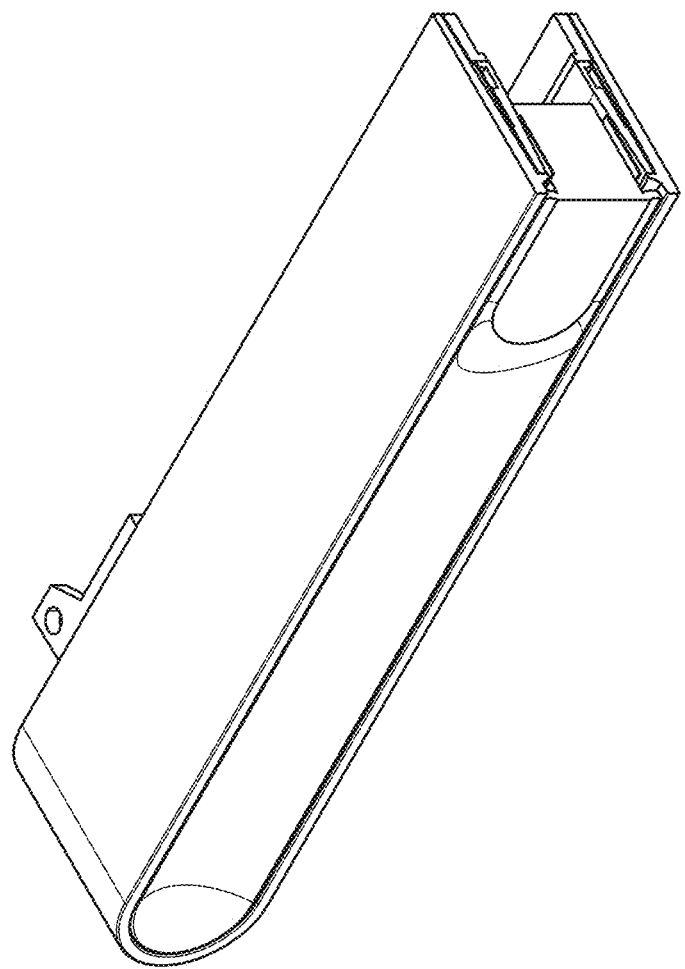
FIG. 4A is a schematic perspective view illustrating a backlight kit according to a third embodiment of the present invention.
Figure 4B:
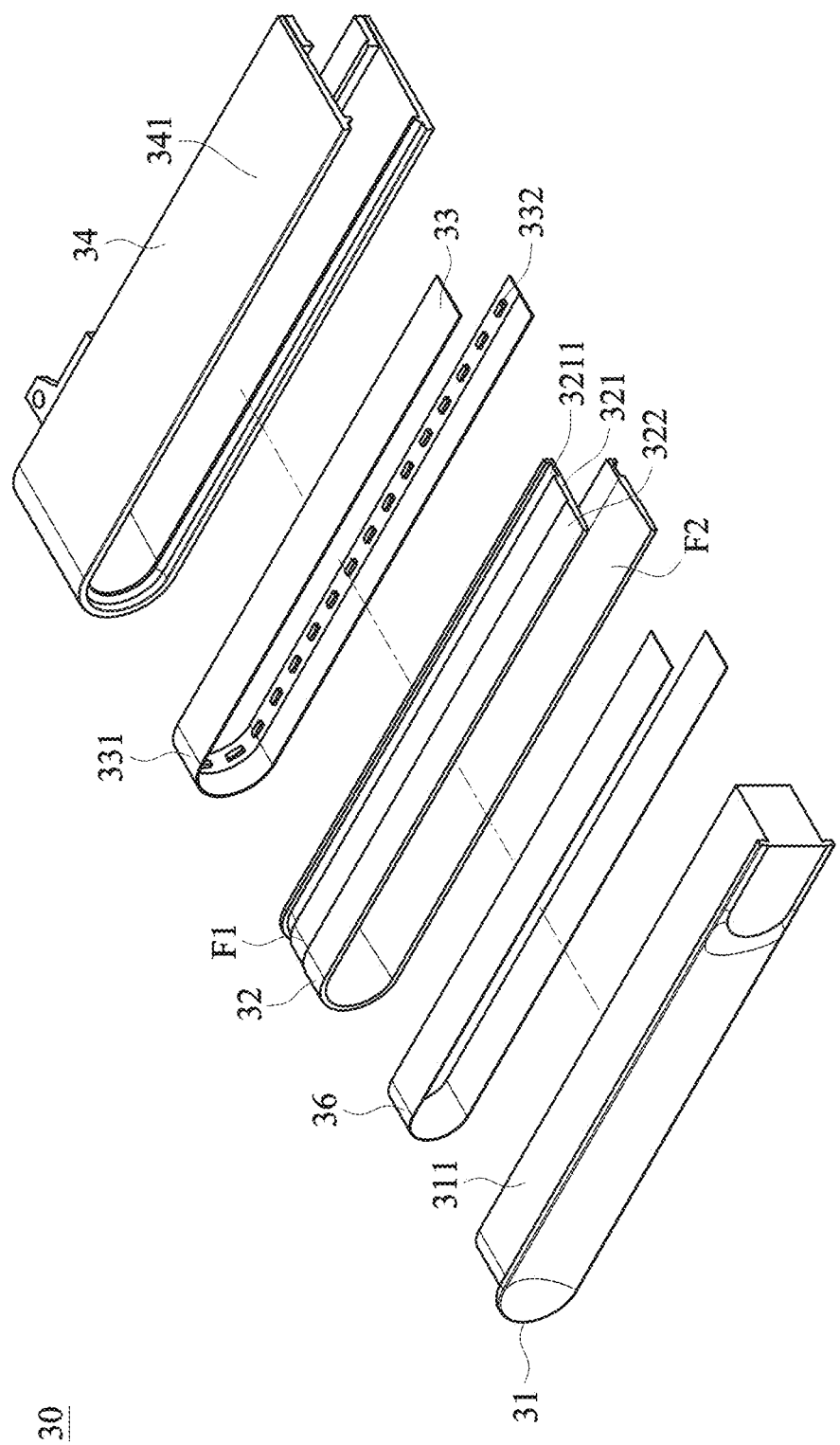
FIG. 4B is a schematic exploded view illustrating the backlight kit according to the third embodiment of the present invention.

Please refer to FIGS. 4A and 4B. FIG. 4A is a schematic perspective view illustrating a backlight kit according to a third embodiment of the present invention. FIG. 4B is a schematic exploded view illustrating the backlight kit according to the third embodiment of the present invention. The functions of the components of the backlight kit 30 that are similar to those of the backlight kit 10 of the first embodiment are not redundantly described herein. In comparison with the backlight kit 10 of the first embodiment, the backlight kit 30 of this embodiment further comprises a reflecting element 36. In addition, a receiving groove 3211 is formed in the first surface F1 of the first light-guiding part 321 of the slim-type light guide plate 32. The plural light-emitting units 332 of the illumination module 33 are aligned with the receiving groove 3211.

Figure 4C:
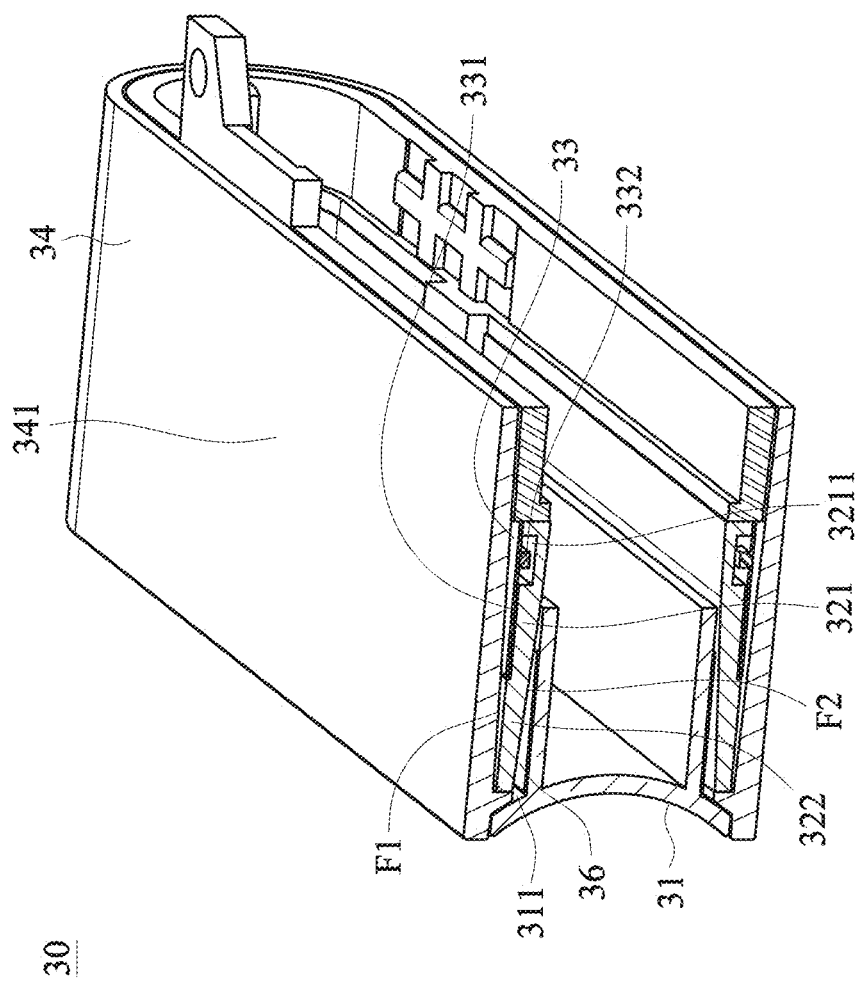
FIG. 4C is a schematic cutaway view illustrating the backlight kit according to the third embodiment of the present invention.
Figure 4D:
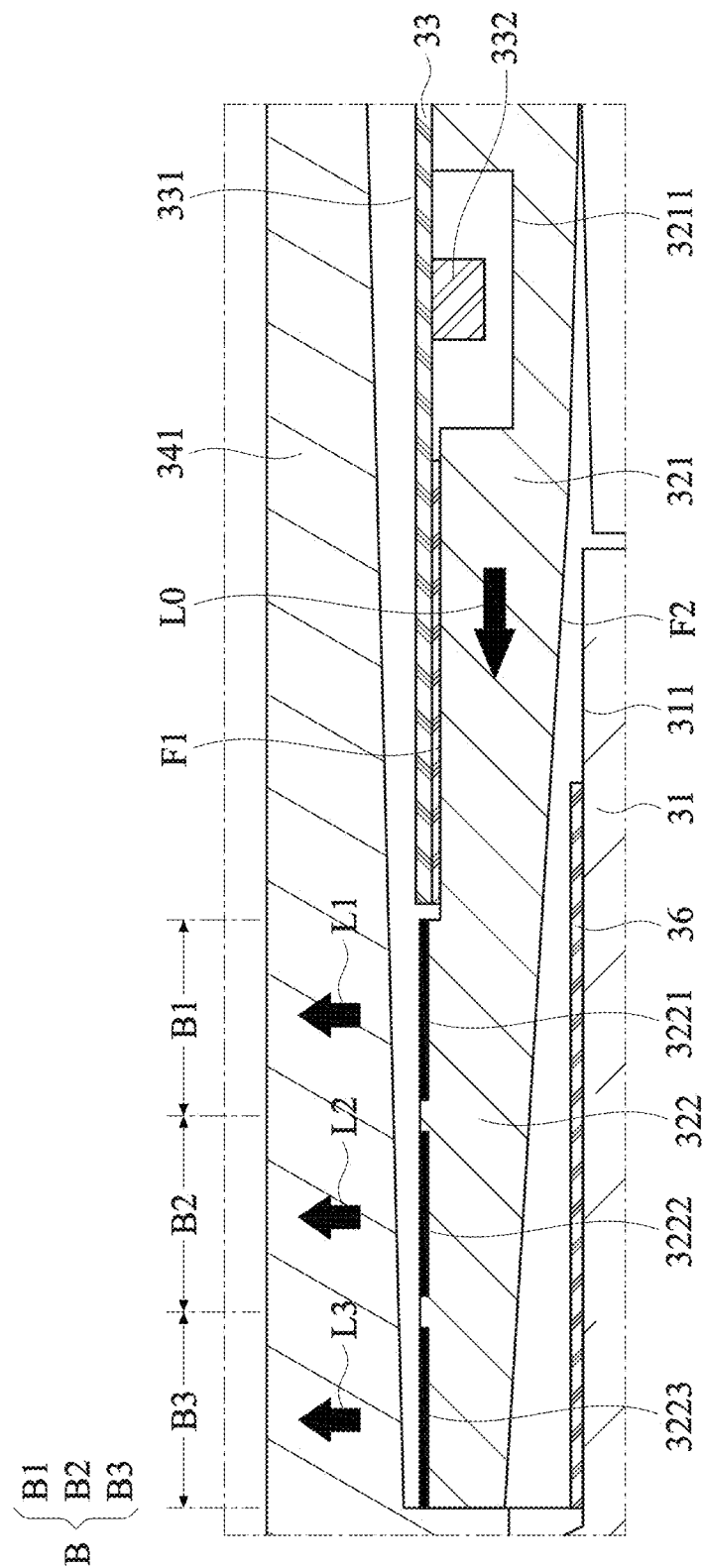
FIG. 4D is a schematic cross-sectional view illustrating an enlarged portion of the backlight kit according to the third embodiment of the present invention.

Please refer to FIGS. 4C and 4D. FIG. 4C is a schematic cutaway view illustrating the backlight kit according to the third embodiment of the present invention. FIG. 4D is a schematic cross-sectional view illustrating an enlarged portion of the backlight kit according to the third embodiment of the present invention. The light-emitting units 332 of the illumination module 33 are disposed within the receiving groove 3211. The reflecting element 36 is arranged between the slim-type light guide element 32 and the concave structure 311. In addition, the reflecting element 36 is aligned with the light diffusion structure regions 3221, 3222 and 3223 of the second light-guiding part 322 of the slim-type light guide plate 32.

When the light-emitting units 332 of the illumination module 33 emit a light beam L0 to the slim-type light guide element 32, the light beam L0 is transferred within the slim-type light guide element 32. Then, the light beam L0 is transferred through the light diffusion structure regions 3221, 3222 and 3223. Consequently, a first-portion light beam L1, a second-portion light beam L2 and a third-portion light beam L3 are respectively exited from the light diffusion structure regions 3221, 3222 and 3223. In this embodiment, the portion of the light beam L0 exited from the second surface F2 of the slim-type light guide plate 32 is reflected by the reflecting element 36. Consequently, the portion of the light beam L0 exited from the second surface F2 of the slim-type light guide plate 32 can be returned back to the second light-guiding part 322 of the slim-type light guide plate 32. Consequently, the loss of the light beam L0 in the transferring process will be effectively reduced. Furthermore, the luminance of the first-portion light beam L1, the luminance of the second-portion light beam L2 and the luminance of the third-portion light beam L3 are increased.

Figure 5A:
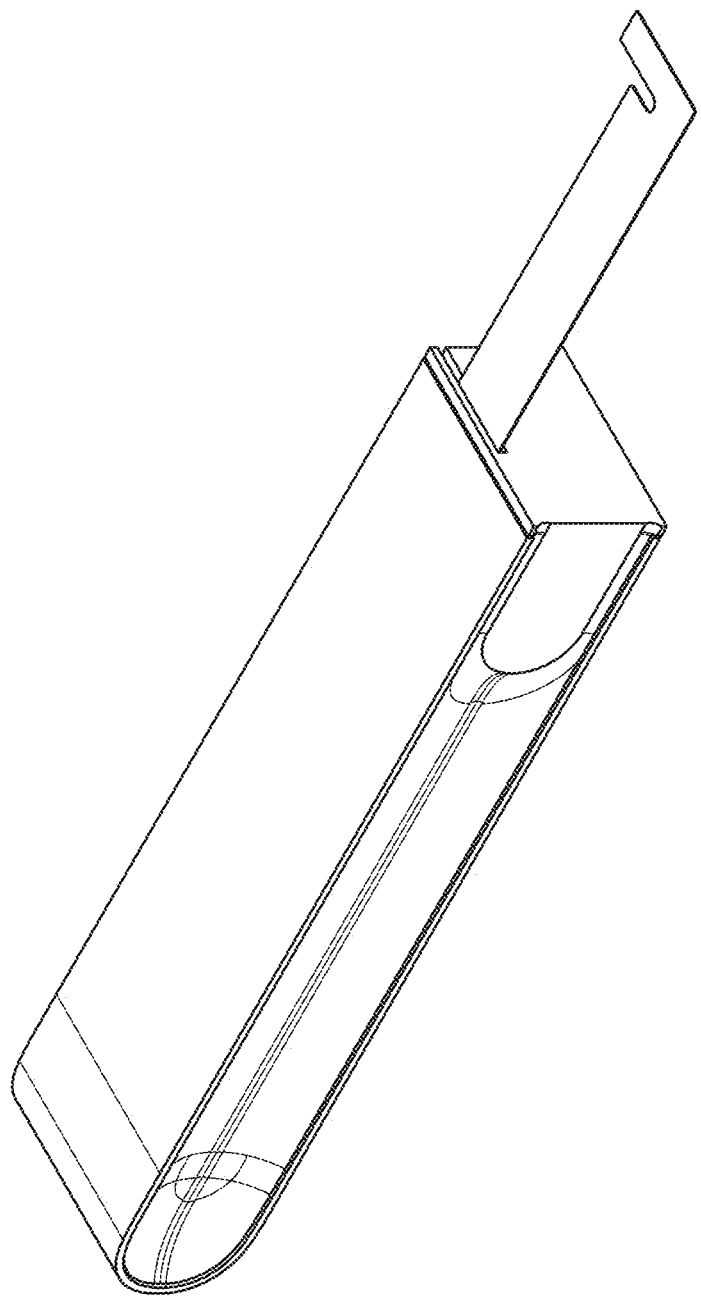
FIG. 5A is a schematic perspective view illustrating a backlight kit according to a fourth embodiment of the present invention.
Figure 5B:
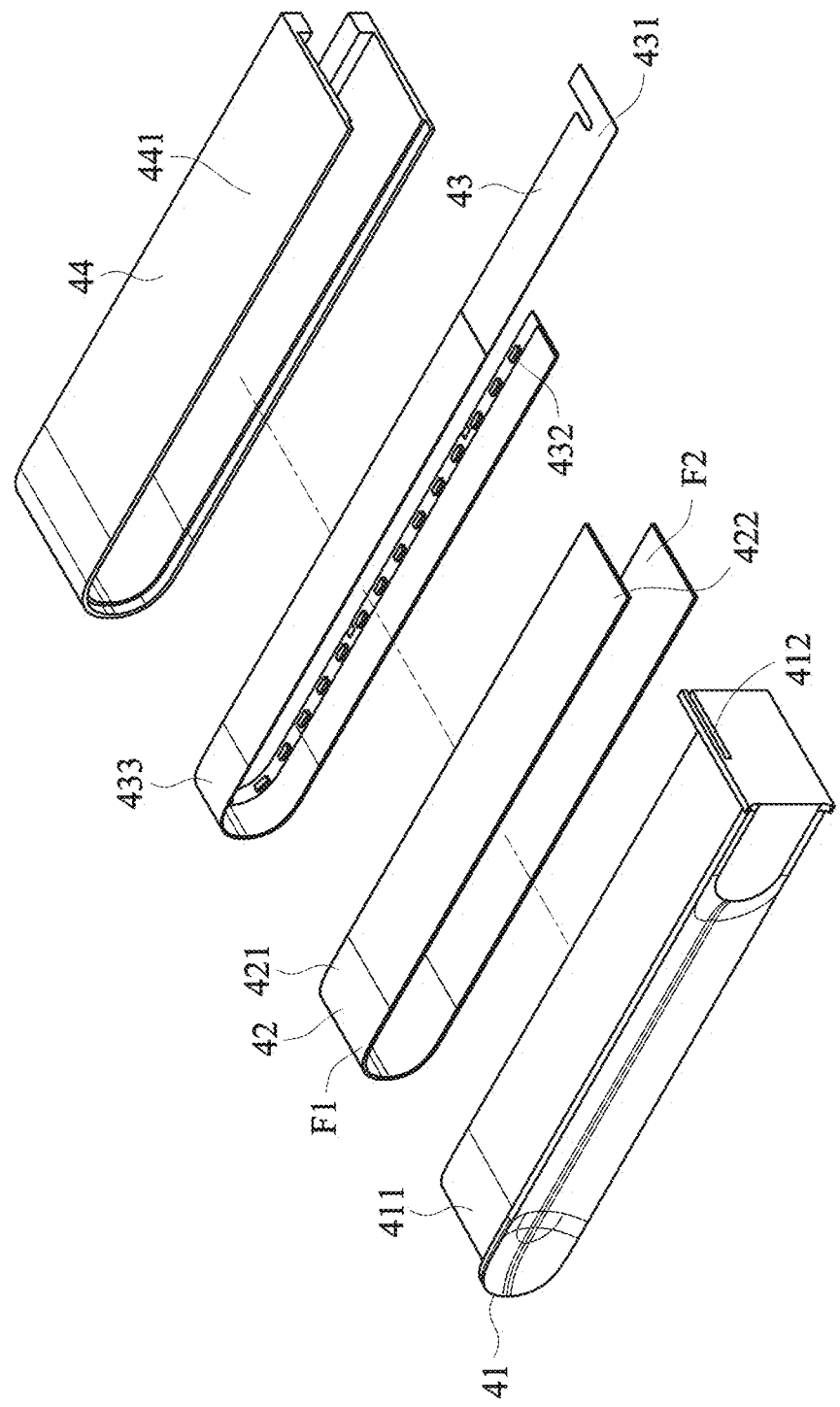
FIG. 5B is a schematic exploded view illustrating the backlight kit according to the fourth embodiment of the present invention.

Please refer to FIGS. 5A and 5B. FIG. 5A is a schematic perspective view illustrating a backlight kit according to a fourth embodiment of the present invention. FIG. 5B is a schematic exploded view illustrating the backlight kit according to the fourth embodiment of the present invention. The functions of the components of the backlight kit 40 that are similar to those of the backlight kit 10 of the first embodiment are not redundantly described herein. In comparison with the backlight kit 10 of the first embodiment, the width of the slim-type light guide element 42 in the backlight kit 40 of this embodiment is smaller than the width of the concave structure 411. In addition, a light-shading layer 433 is formed on the surface of the flexible circuit board 431 where the light-emitting units 432 are not installed.

Figure 5C:
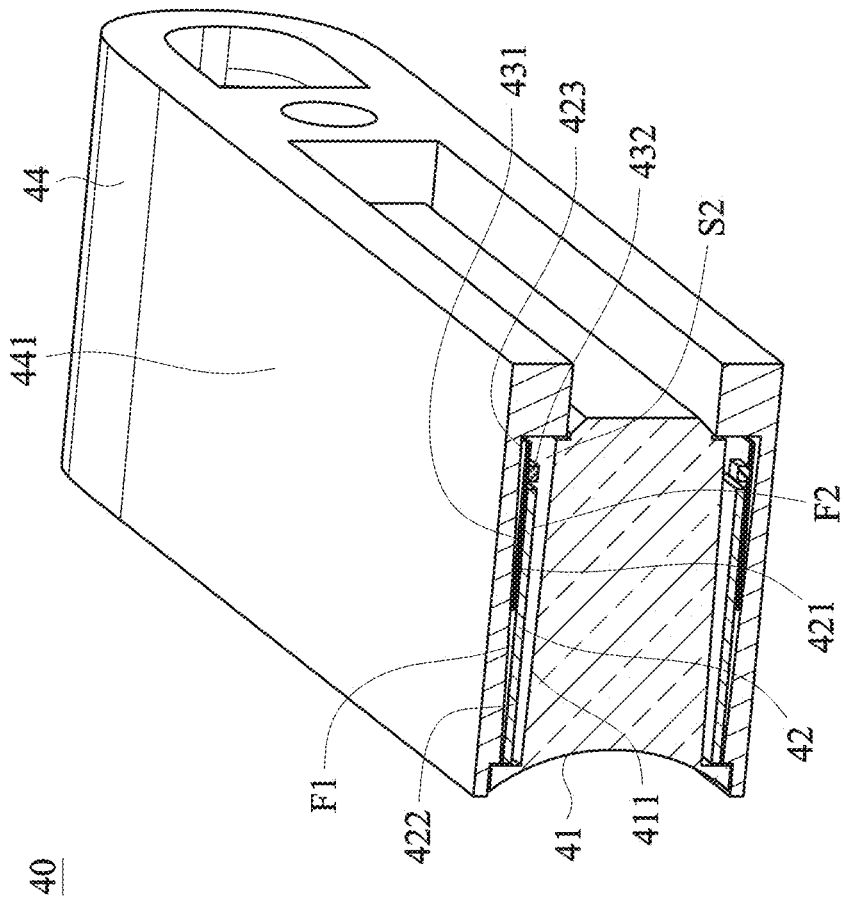
FIG. 5C is a schematic cutaway view illustrating the backlight kit according to the fourth embodiment of the present invention.
Figure 5D:
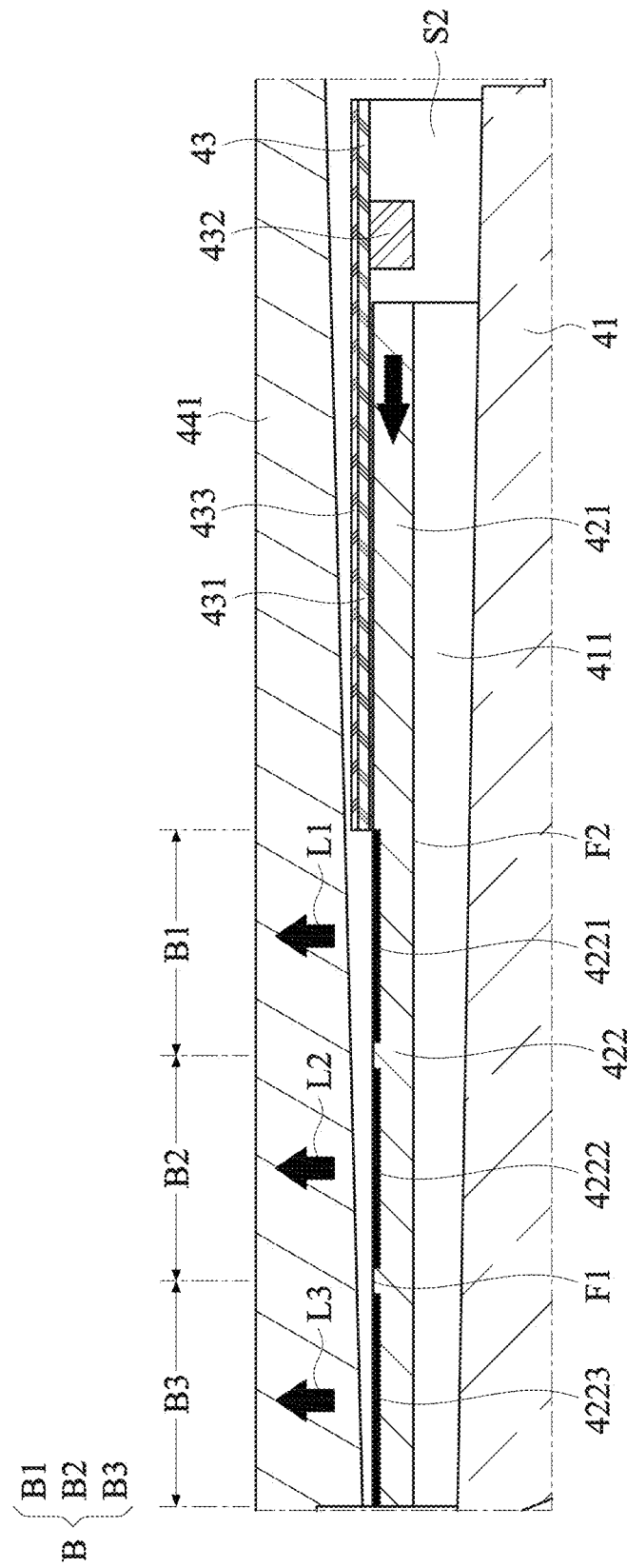
FIG. 5D is a schematic cross-sectional view illustrating an enlarged portion of the backlight kit according to the fourth embodiment of the present invention.

Please refer to FIGS. 5C and 5D. FIG. 5C is a schematic cutaway view illustrating the backlight kit according to the fourth embodiment of the present invention. FIG. 5D is a schematic cross-sectional view illustrating an enlarged portion of the backlight kit according to the fourth embodiment of the present invention. The assembled structure of the backlight kit 40 will be described as follows.

As mentioned above, the width of the slim-type light guide element 42 is smaller than the width of the concave structure 411. Consequently, an avoidance gap S2 is formed between a lateral side of the first light-guiding part 421 (i.e., the lateral side where the illumination module 43 is installed) and the covering member 44. The light-emitting units 432 of the illumination module 43 are disposed within the avoidance gap S2. Furthermore, the avoidance gap S2 and a portion of the first surface F1 of the first light-guiding part 421 are shaded by the flexible circuit board 431 and the light-shading layer 433.

After the light-emitting units 432 of the illumination module 43 emit a light beam L0 to the slim-type light guide element 42, the light beam L0 is transferred within the slim-type light guide element 42. Then, the light beam L0 is exited from the first surface F1 of the second light-guiding part 422. That is, through the light diffusion structure regions 4221, 4222 and 4223 on the first surface F1 of the second light-guiding part 422, a first-portion light beam L1, a second-portion light beam L2 and a third-portion light beam L3 are respectively exited from the light diffusion structure regions 4221, 4222 and 4223. In addition, the light-shading layer 433 can prevent the light beam L0 from being exited from the avoidance gap S2. Since the light beam L0 is not leaked out, the luminous visual effect will not be adversely affected.

From the above descriptions, the present invention provides the backlight kit. Due to the arrangement of the slim-type light guide element, the backlight kit produces a luminance-gradient visual effect. Moreover, the arrangement of the slim-type light guide element can reduce the volume of the backlight kit. Consequently, the overall volume of the electronic device with the backlight kit can be effectively reduced, and the electronic device can meet the slimness requirements. In addition, a luminance gradient region is created at the end of the slim-type light guide element away from the light-emitting units. In other words, it is not necessary to install the light-emitting unit at the position corresponding to the luminance gradient region. Furthermore, the flexibility and freedom of the electronic circuit in the electronic device can be effectively enhanced. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A backlight kit, comprising:
a base member comprising a concave structure;
a covering member combined with the base member, wherein the covering member comprises a lateral wall part, and the concave structure of the base member is covered by the lateral wall part;
a slim-type light guide element disposed within the concave structure of the base member, and comprising a first surface and a second surface, wherein the first surface and the second surface are opposed to each other, the first surface faces the lateral wall part of the covering member, the second surface faces the concave structure of the base member, and at least three light diffusion structure regions are formed on a first side and the first surface of the slim-type light guide element; and
an illumination module installed on a second side of the slim-type light guide element, wherein the second side of the slim-type light guide element is away from the at least three light diffusion structure regions, wherein after the illumination module emits a light beam, the light beam is transferred through the slim-type light guide element, and a first-portion light beam, a second-portion light beam and a third-portion light beam are respectively exited from a first light diffusion structure region, a second light diffusion structure region and a third light diffusion structure region of the at least three light diffusion structure regions,
wherein after the first-portion light beam, the second-portion light beam and the third-portion light beam are transferred to the lateral wall part of the covering member, a first luminance region, a second luminance region and a third luminance region are formed on the lateral wall part of the covering member, wherein the first luminance region, the second luminance region and the third luminance region are collaboratively formed as a luminance gradient region.

2. The backlight kit according to claim 1, wherein each of the at least three light diffusion structure regions comprises light diffusion microstructures, and the light diffusion microstructures are dot structures or textured structures.

3. The backlight kit according to claim 1, wherein an average size of the light diffusion microstructures in the third light diffusion structure region is larger than an average size of the light diffusion microstructures in the second light diffusion structure region, and the average size of the light diffusion microstructures in the second light diffusion structure region is larger than an average size of the light diffusion microstructures in the first light diffusion structure region.

4. The backlight kit according to claim 3, wherein the average size of the light diffusion microstructures in the third light diffusion structure region is larger than 10 μm, the average size of the light diffusion microstructures in the second light diffusion structure region is in a range between 4 μm and 8 μm, and the average size of the light diffusion microstructures in the first light diffusion structure region is in a range between 2 μm and 4 μm.

5. The backlight kit according to claim 4, wherein a width of the luminance gradient region is equal to or larger than 20 mm.

6. The backlight kit according to claim 1, wherein the backlight kit further comprises a light diffusion element, wherein the light diffusion element is arranged between the lateral wall part of the covering member and the slim-type light guide element, and the light diffusion element is aligned with the at least three light diffusion structure regions.

7. The backlight kit according to claim 1, wherein the slim-type light guide element comprises a first light-guiding part and a second light-guiding part.

8. The backlight kit according to claim 7, wherein the at least three light diffusion structure regions are installed on the first surface of the second light-guiding part of the slim-type light guide element.

9. The backlight kit according to claim 7, wherein the illumination module comprises a flexible circuit board and plural light-emitting units, and the plural light-emitting units are installed on a surface of the flexible circuit board.

10. The backlight kit according to claim 9, wherein plural openings are formed in the first surface of the first light-guiding part of the slim-type light guide element, and the plural light-emitting units are respectively disposed within the plural openings.

11. The backlight kit according to claim 9, wherein a receiving groove is formed in the first surface of the first light-guiding part of the slim-type light guide plate, and the plural light-emitting units are disposed within the receiving groove.

12. The backlight kit according to claim 9, wherein an avoidance gap is formed between the first light-guiding part of the slim-type light guide plate and the covering member, and the plural light-emitting units are disposed within the avoidance gap.

13. The backlight kit according to claim 9, wherein the first surface of the first light-guiding part of the slim-type light guide element is covered by the flexible circuit board.

14. The backlight kit according to claim 9, wherein a light-shading layer is formed on another surface of the flexible circuit board where the light-emitting units are not installed.

15. The backlight kit according to claim 9, wherein the light-emitting units are light emitting diode (LED) units, organic light emitting diode (OLED) units, quantum dots light emitting diode (QLED) units or electroluminescence (EL) units.

16. The backlight kit according to claim 1, wherein the backlight kit further comprises a reflecting element, wherein the reflecting element is arranged between the slim-type light guide element and the concave structure of the base member, and the reflecting element is aligned with the at least three light diffusion structure regions.

17. A backlight kit, comprising:
a base member comprising a concave structure;
a slim-type light guide element disposed within the concave structure, and comprising a first surface and a second surface, wherein the first surface and the second surface are opposed to each other, the second surface faces the concave structure of the base member, and a light-guiding gap is formed between a first side of the slim-type light guide element and the base member;
a covering member combined with the base member, wherein the covering member comprises a lateral wall part, and a light-guiding rib is installed on an inner wall of the lateral wall part and aligned with the light-guiding gap, wherein the concave structure of the base member is covered by the lateral wall part, and the light-guiding rib is inserted in the light-guiding gap; and
an illumination module installed on a second side of the slim-type light guide element, wherein the second side of the slim-type light guide element is away from the light-guiding gap, wherein after the illumination module emits a light beam, the light beam is transferred through the slim-type light guide element, and a first-portion light beam and a second-portion light beam are respectively exited from the first surface of the slim-type light guide element and the light-guiding rib, wherein after the first-portion light beam and the second-portion light beam are transferred to the lateral wall part of the covering member, a first luminance region and a second luminance region are formed on the lateral wall part of the covering member, wherein the first luminance region and the second luminance region are collaboratively formed as a luminance gradient region.

18. The backlight kit according to claim 17, wherein the illumination module comprises a flexible circuit board and plural light-emitting units, and the plural light-emitting units are installed on a surface of the flexible circuit board.

19. The backlight kit according to claim 18, wherein plural openings are formed in the first surface and the second side of the slim-type light guide element, wherein the second side of the slim-type light guide element is away from the light-guiding gap, and the plural light-emitting units are respectively disposed within the plural openings.

20. The backlight kit according to claim 18, wherein a portion of the first surface of the slim-type light guide element is covered by the flexible circuit board.

21. The backlight kit according to claim 18, wherein a light-shading layer is formed on another surface of the flexible circuit board where the light-emitting units are not installed.

22. The backlight kit according to claim 18, wherein the light-emitting units are light emitting diode (LED) units, organic light emitting diode (OLED) units, quantum dots light emitting diode (QLED) units or electroluminescence (EL) units.

* * * * *